(12) United States Patent
Grecia

(10) Patent No.: US 7,103,261 B2
(45) Date of Patent: Sep. 5, 2006

(54) CONSUMER FRIENDLY ERROR CORRECTING FORMATING METHOD FOR WHITE BOOK 2.0 VIDEO COMPACT DISC WITH CD-DA RED BOOK AUDIO TRACKS

(76) Inventor: William Grecia, 2541 7 Ave., #8G, New York, NY (US) 10039

( * ) Notice: Subject to any disclaimer, the term of this patent is extended or adjusted under 35 U.S.C. 154(b) by 1426 days.

(21) Appl. No.: 09/873,705

(22) Filed: Jun. 4, 2001

(65) Prior Publication Data

US 2003/0165328 A1    Sep. 4, 2003

(51) Int. Cl.
*H04N 5/93* (2006.01)
*H04N 5/85* (2006.01)

(52) U.S. Cl. .................... 386/52; 386/96; 386/126; 369/30.04

(58) Field of Classification Search ............... 386/52, 386/125–126, 96; 369/30.4
See application file for complete search history.

(56) References Cited

U.S. PATENT DOCUMENTS

| | | | | |
|---|---|---|---|---|
| 5,301,172 A | * | 4/1994 | Richards et al. | 369/30.04 |
| 5,467,327 A | * | 11/1995 | Jamail | 369/30.04 |
| 5,471,443 A | * | 11/1995 | Jamail et al. | 369/30.04 |
| 5,619,731 A | * | 4/1997 | Jenkins et al. | 369/30.18 |
| 5,687,160 A | * | 11/1997 | Aotake et al. | 386/126 |
| 6,043,828 A | * | 3/2000 | Ort | 369/275.3 |
| 6,718,501 B1 | * | 4/2004 | Brody et al. | 386/94 |
| 2002/0064102 A1 | * | 5/2002 | Mons | 369/30.04 |

* cited by examiner

*Primary Examiner*—Vincent F. Boccio

(57) ABSTRACT

Consumer friendly compact disc which employ MPEG 1 video data for DVD players, computers, and CD-DA tracks for Compact Disc players with traditional playback identified by these independent machines. DVD playable MPEG 1 video time will not alter CD audio playability in CD players due to a 4-second track 1 Table of Contents time. Playback of disc in DVD players allows Play Back Control (PBC) of MPEG 1 data without interaction of CD-DA tracks. The method employed ensure a compact disc free from digital E32 type sector errors associated with PRE GAP and untrue lead out point now true with current white book 2.0 spec when including CD-DA tracks. This specially authored formatted disc derived from a previous unperfected white book spec allow the bridging of three of the most popular consumer products of our time, the DVD player, CD player and the home computer.

4 Claims, 2 Drawing Sheets

CONSUMER FRIENDLY ERROR CORRECTING FORMATING METHOD FOR WHITE BOOK 2.0 VIDEO COMPACT DISC WITH CD-DA RED BOOK AUDIO TRACKS

REFERENCE TO RELATED APPLICATIONS

311744 Sep. 23, 1994 Jenkins; Kimble L (Memphis, Tenn.); Scholes; C. Patrick (Memphis, Tenn.) Interactive music CD and data 623808 Mar. 29, 1996 Ort; Jeffrey 345/501: Method and apparatus for handling proprietary and non-proprietary formatted compact discs in the same video playback system 976107 Nov. 13, 1992 Richards; Norman D. (Horsham, GB2); Timmermans; Jozef M. K. (Bilzen, BE); Schepers; Jos G. (Peer, BE); Voogd; Harmen D. (Best, NL) 369/32: Method of storing user information items and apparatus for reproducing stored items 500998 Aug. 8, 1995 Aotake; Hidenori (Kanagawa, JP); Hosono; Yoshimasa (Kanagawa, JP); Mizunashi; Toshimasa (Kanagawa, JP); Nakada; Shuhei (Kanagawa, JP) 369/275.3: Optical recording medium with lists having playback control information 696,325 Oct. 26, 2000 Grecia; William 345/NA: Method of recording PCM stereo and 5.1 digital surround bitstream together on same CD medium

BACKGROUND OF INVENTION

White Book version 2.0 was drawn up to create a first-class medium for producers of interactive multimedia titles for entertainment, CBT, or POI station purposes. It provides the possibility of including up to 2000 play items, consisting of MPEG video, MPEG stills with or without audio, and CD-Digital Audio, and allows the interactively controlled playback of these items by the consumer. Video CD conforms to the Bridge Disc concept. The first track is a data track containing an ISO 9660 file structure and special information for CD-I, VCD, and DVD players. The next tracks are MPEG-Audio-Video-Tracks each containing sequences with MPEG video and audio data. Behind the MPEG-Audio-Video-Tracks Red-Book-Tracks can follow. The maximum track number of a video CD is 99 including the Video CD data track (track 1). If the last tracks of the discs are Red-Book-Tracks, the Lead-out area may as well be encoded as an audio track. The area of an compact disc where the MPEG video data content contained on track 1 of an disc TOC end, and the track(s) for red book audio began, cause a E32 type digital zero error and cause consumer compact disc players to produce a loud pop when played through. When fast forward or rewind function is active over this area of the disc, louder digital distortion occurs. Another problem with the current white book 2.0 standard is when the addition of red book cd-da tracks are added to the disc makeup, a true red book lead out point which silence the end of digital binary signal flow is replaced by a audible lead out point. This allows user to hear yet another loud E32 type pop at the end of disc. While not audible in most dedicated MPEG reading hardware devices, the lack of proper red book lead out point hinder the use of disc in CD player carousels and auto repeating CD players. The current format of the white book 2.0 standard from Sony/Philips lack the standard for video CD+CD-DA tracks for the consumer market without error when playback in an traditional CD player permit This extended format of the white book 2.0 spec may not be efficient enough for proper disc replication. For an undisturbed CD listening experience, a user currently need to listen through or skip past at least 2 of the first tracks on a CD TOC before CD-DA tracks began. With this invention, inventor has found the way to correct both error problems on disc, and formatting of the white book 2.0 spec for undisturbed traditional CD-DA track listening of video CD CD-DA content in a traditional CD player.

REFERENCES

Cequadrat VideoPack version 4.00.079 CeQuardrat GmbH, Germany and CeQuadrat USA Inc.

SUMMARY OF INVENTION

With current boom of DVD player sales worldwide, and the current user base of CD players thereof, a format to bridge two of the biggest consumer electronic items of all time have created the opportunity for this corrective invention of an error filled specification. Inventor has found a method to author a compact disc to fully take advantage of DVD players with MPEG 1 playback capabilities, and traditional listening practices of CD audio in CD players. Past problems with popping and digital distorting noise of so called original bridged disc format did not allow a consumer friendly product. Inventor has found the way to make such a format a reality.

BRIEF DESCRIPTION OF DRAWINGS

FIG. 2 display final authored disc. 1B is the lead in point, same as mentioned above. 2B show altered track 1 of white book data. 2B are now given an index of 00 from 01 and a new 01 is programmed in 3B. 3B dictate the mandatory 4 seconds before track 2 as per the yellow book standard. 4B represent reprogramming of TOC start ID for actual audio track At this point Mode 2 silence now cover the offending PRE GAP area of 3A of FIG. 1. 5B represent a true and ISO 9660 compliant lead out point.

DETAILED DESCRIPTION

Figure 1:
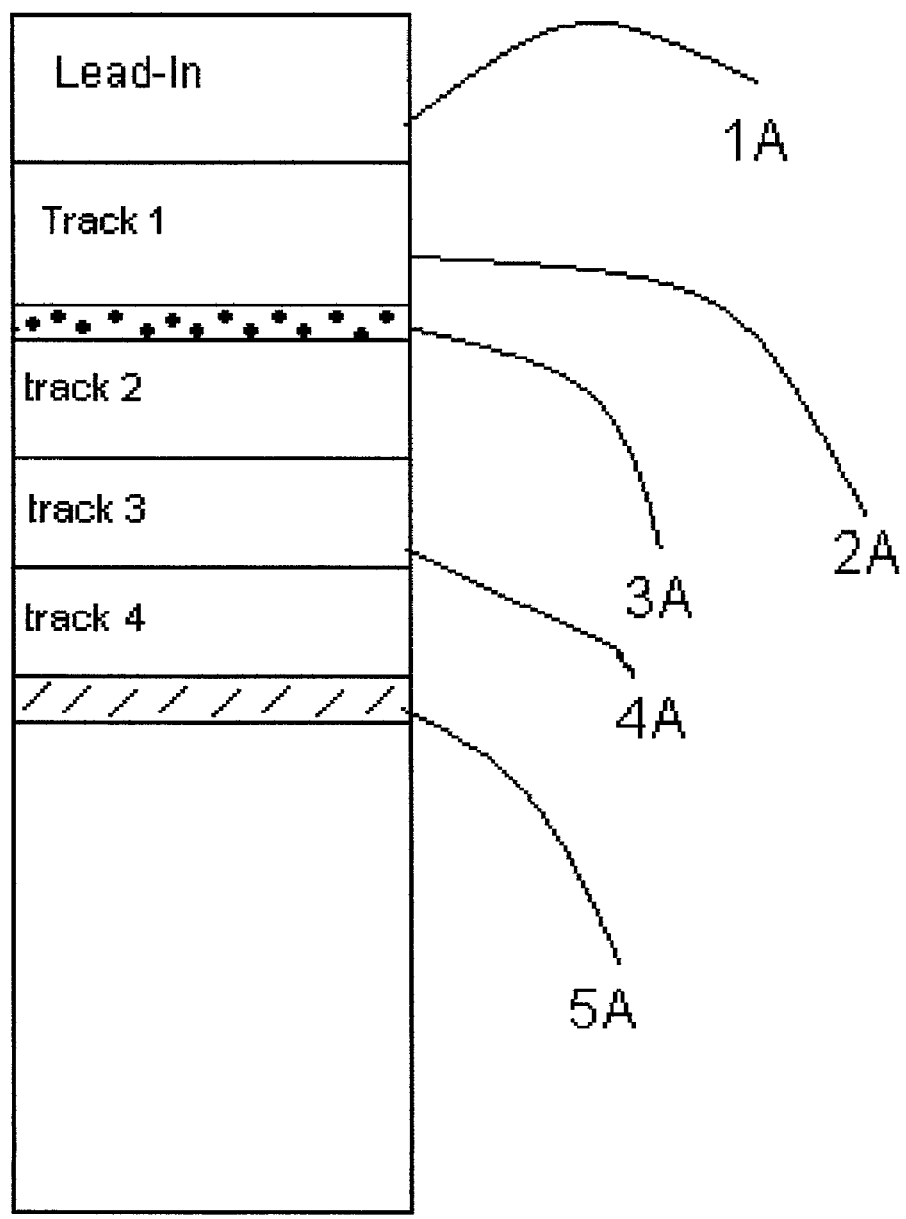
FIGS. 1 and 2 simply show the programming area of a 74-minute compact disc. Within FIG. 1, 1A display a simple lead in point. Disc information such as Table of Contents (TOC) and basic medium identification files are stored here. 2A display track one of this white book formatted CD. Within this area always contain the white book 2.0 file structure as dictated by original spec. This drawing display a traditionally authored Video CD. Within 2A inventor's structure of MPEG files reside here, then leaving CD-DA programming to start at 4A. 3A show the offending PRE GAP area. As shown, this area is between disc data track 1 and CD-DA track 2. 4A is the 10 seconds of silence or otherwise known as "dummy" track of track 2 of disc, followed by actual audio filled tracks in 3 and 4. 5A display the offending untrue lead out point associated with traditional white book disc.

CDs are physically divided into tracks. In the case of Video CDs, all tracks are recorded in a single session, after which the CD cannot be written to again. The beginning of the session has a session lead-in, and the end of the session has a lead-out.

The lead-in is followed by track 1 of the Video CD, which is the Video CD data track. The MPEG tracks consecutively follow track 1. The MPEG tracks are followed by the CD-DA (Compact Disc-Digital Audio) tracks. The session ends with the lead-out. The maximum number of tracks allowed on any CD is 99. The Video CD data track contains data needed for the Video CD, CD-I or DVD player to play back the Video CD The file system of the data track is ISO9660. The track starts with a two-second gap, followed by 16 empty sectors, according to standard ISO9660. The PVD (Primary volume Descriptor) is located at time-code 00:00:02:16. The PVD contains basic information about the CD.

It is possible to add other files and directories to this structure as needed. Since inventor authoring method take advantage of video content contained within video CD data track, traditional DAT files are not present within video CD MPEGAV folder. For this reason a video file with the ISO extension of MPG is added to this portion of the disc. This will allow playback of similar content of video material with use with ISO 9660 reading PC or MAC.

The structure of a Video CD is the definition of the information placed on the Video CD, and how each piece of information is linked to the other pieces. This structure is coded into the Video CD information area, and later retrieved by the playback device, i.e. the DVD player.

The four basic elements contained on a Video CD, as defined by the White Book 2.0 are:

Play list—A play list is a list of one or more play items, which are played sequentially without user interaction.

Play item—A play item is an object representing the audio-visual data contained on the Video CD. A play item can represent the following types of data: MPEG audio and/or MPEG still, MPEG file, MPEG track, CD-DA track. MPEG audio, MPEG track and CD-DA tracks occupy a physical discrete track number within disc TOC while MPEG still and MPEG file reside within the same track number of 1 as the video CD data.

Selection list—A selection list contains one play item and zero or more selection items allowing user interaction.

Selection item—A selection item is a link that is activated either by the player's pointing device being clicked on a defined button, or by pressing a key on the player's remote control. The link can lead either to a play list, or a selection list.

The MPEG videos on a Video CD must meet certain requirements, which are outlined in the White Book. To create MPEG videos for Video CD there is a range of hard and software solutions available. When making MPEGs it is important to encode to White Book specifications.

MPEG video can either be stored as a separate track on the Video CD (MPEG track) or as a play item inside the Video CD data track (MPEG file). MPEG tracks must be encoded to MPEG-1 standard at CBR (Constant Bit Rate) 1150 kbit/s video and 224 kbit's audio, and must be multiplexed according to White Book standard. Most encoding software will have a standard setting called White Book or Video CD to produce appropriate MPEG streams. MPEG files can have a data rate of up to 1,37 Mbit/s split at different ratios between the video and the audio data rate. For audio encoding, three data rates are allowed for single channel mode (64, 96, and 192 kbit/s), and four data rates for stereo, intensity stereo and dual channel mode (128, 192, 224, and 384 kbit/s). The rest of the bandwidth is available for video.

Traditionally the MPEG stream is converted to DAT files and placed within the MPEGAV folder within the white book file system. This in the past cause problems with easy access to theft and bootlegging of copyright material. With inventor's authoring and formatting method, all video tracks are contained within disc data track as MPEG files. A DAT file is produced in the VCD folder of the white book structure which contain a combination of files for programming DVD, VCD, or CD-I playback machine or device for MPEG 1 decoding, play items, and menus. Playback of such a DAT file by means of an PC or MAC media player i.e. Windows Media, or Apple Quick Time may error with this file. For this reason inventor opt to add an additional file within the ISO 9660 structure of the same video feature of MPEG 1 material as contained in the disc data track as a MPG file extended item. To prevent easy theft of this file, inventor figured to change tradition CBR (constant bit rate) encoding of 1500 kbs to VBR (variable bit rate) encoding of 1500 kbs with the MPG extended ISO file. The VBR decision allow same playback of MPG file to resume within PC or MAC media players, but all authoring software programs such as Ahead Nero, Adaptec Easy CD Creator, and Cequadrat WinonCD product will not allow disc burning of non compliant video CD.

The Video CD is part of the family of Compact Discs (CD). It conforms to system descriptions that are published in several specifications starting with the so called Red Book for CD Audio, the Yellow Book and the Extended Yellow Book for CD-ROM and CD-ROM/XA, the Green Book for CD-i and the definition of CD Bridge. These books are published by Philips and Sony in cooperation with other companies like Matsushita and Microsoft and are only available for licensees.

The structure of CDs is defined by a lead-in area followed by the program area containing user data, and the lead-out area finishes CDs. Lead-in and lead-out area of Video CDs contain series of empty of CD-ROM/XA Mode 2 Form 2 sectors. Although the Lead-in area contains empty sectors there are so called subchannels (P, Q, R, S, T, U, V, W) in addition to every sector containing information about the disc. The main subchannels are P and Q containing control information, the disc's time code and a Table of Contents (TOC) giving the starting time of the tracks on the CD and allowing direct access by this way. In the program area of the Video CD there can be different kinds of tracks. Tracks are data units built from one unique sector format defined by the specification books. An Audio CD for example contains sectors conforming to the specification of the Red Book. On an Audio CD each track contains the data of one song, and track-jumping enables the access to the songs. Data tracks of CD-ROMs conform to the Yellow Book. Access to the disc's data is done by a file system conforming to ISO 9660 standard. Green Book (CD-i) sectors, Form 1 and Form 2, have the same physical structure as CD-ROM/XA tracks. Form 1 sectors size is 2048 Bytes user data and used to store computer data. An additional error correction scheme increases data integrity. Form 2 sectors size is 2324 Bytes and used to store video and audio sequences, where only the mandatory CD error correction scheme and no additional one is sufficient Bridge Discs combine green tracks with red or yellow ones.

A video CD with the extended option of added CD-DA tracks follow the same rules as traditional red book digital audio 99 track structure, and white book MPEG dedicated programming 99 track structure. Video CD conforms to the Bridge Disc concept. A problem occurs when the traditional bonding or bridging of both the mode/form 2 sectors and red book CD-DA sectors join on the disc. Traditional authoring or formatting of white book compact disc allow TOC track number to began at the same point/sector range as the bridging of the two adjoining disc modes. What result is an audible digital noise to be decoded by traditional compact disc players without the proper MPEG decoding mechanisms installed to silence the switch. This is also the result of an automatic PRE GAP insert in the sectors between mode 2 material of the disc data track and the red book sectors of the CD-DA tracks. The PRE GAP area of insert is dictated by a digital zero time frame of three seconds. The white book spec also dictates if the last tracks of the discs are Red-Book-Tracks, the Lead-out area may as well be encoded as an audio track. This cause a problem with traditional CD players with auto repeat functions and CD carousel units, relieving the ability to detect a true end point of the compact disc. With the white book version of the lead out point, traditional CD players see this area as a broken sector and cause a stop of disc by default with an audible popping error to the listener. This error prevents CD player to program itself to either auto repeat, skip to next disc, or have a clean stop.

Inventor noted the problem with this and discovered this authoring method to prevent these errors. Also the following explanation will outline complete authoring of white book video CD data track which contain all MPEG play items and menus. Also explained is the consumer friendly formatting of disc TOC to make disc enjoyable to users without MPEG decoding devices (i.e. DVD players) without having any "MPEG tracks" to occupy the program area of the disc that is associated with traditional red book CD-DA dedicated compact disc listening. This method allow enjoyment and use of data reading of all devices with MPEG decoding and this is usually identified by an Compact Disc Digital Video logo as per Philips licensing with full PBC (Play Back Control). Authoring of this special white book formatted disc involve several steps. To begin preparations for disc authoring and formatting, all files for disc must be encoded and prepared. Video content can come from many sources for MPEG 1 encoding. Some common source of material are Mini DV, Digital 8, analog capture via an PC or MAC video capture card such as ATI all in wonder 128 pro, and Dazzle cards. Once video content is captured from source, it is then given a PC or MAC file extension. Most common of such is Microsoft AVI (Audio Video Interleave) system. This file extension compresses an audio and video file into one independent file. The most common specification of AVI file derived for digital source such as Mini DV and Digital 8 is a video resolution of 720×480 29.97 fps for NTSC and 720×488 25 fps for PAL. AVI audio for both video standards is the same at 16 bit 48000 kHz. The MPEG 1 standard call for a video resolution of 352×240 29.97 fps for NTSC and 352×288 25 fps for PAL. Deinterlacing of video is a must Audio for both is standard compact disc frequency of 16 bit 44.1 kHz. Many option are available to prepare AVI file for video CD authoring such as Panasonic MPEG 1 encoder and Tsunami TMPENC product. The latter is inventor's choice of program Inventor recommends and executes conversion of audio side of AVI file with external software sample conversion method outside MPEG 1 encoding software integrated system. Inventor have found sample conversion of audio portion of AVI file with MPEG encoder lack due to the fact the program perform double processing task of encoding MPEG video and sample conversion of 48000 kHz AVI audio to 44.1 kHz MPEG layer II audio. What usually results is a somewhat metallic version of the audio. Inventor use Sonic Foundry Sound Forge product to resample 48000 kHz AVI audio to a 44.1 kHz WAV file. Any adequate program can do this task. Once video AVI and audio WAV file are prepared, encoding of MPEG 1 file can resume. This will produce an MPEG file with an extension of MPG. If this file is the main program of video content for disc, then a second pass of encoding is done to prepare a MPG file for the inclusion within the disc ISO 9660 area for PC and Mac media player playback. All encoding setting remains the same except only one. The encoding setting for rate control mode is changed from CBR (Constant Bit Rate) to VBR (Variable Bit Rate). This method is to help prevent illegal authoring of final exposed MPG file in ISO area of disc as mentioned earlier. Once all play items are prepared, preparations are made for the menu structure. Inventor chooses to use simple bitmap or jpeg image files for menu Full MPEG files can be used as an item for this if needed. Once all MPG files are prepared, formatting and structuring for disc TOC track 1 of data is now built. Inventor's program of choice for this task is Cequadrat Video Pack 4.0 product First the introduction play item is placed into structure. This item have no PBC control capabilities and more than one play item can occupy this part of the video CD structure. Next the menu item is established. The menu will surface in the video structure only and when all initial play items are finished. From the menu part of this structure. Programming of extended play items and additional menus are connected here. This menu hold all ability to skip and proceed to next item via on screen button(s) or the pressing of number keys/skip button of MPEG decoding playback device remote control. Programming is established to allow user to select between play items at will with the menu to immediately follow the last play items play completion. The play items contained in this track one data area are prepared and programmed, as MPEG files, not MPEG tracks. Thus reason behind invented method to keep all MPEG White Book files included within track one data track, whereas programming MPEG content at this stage for MPEG track would place MPEG data physically on an independent TOC track and not within the disc TOC data track one. Once structuring and programming of MPG files are complete, the structure is then saved as Cequadrat session file with an extension of CPJ. This session is then imported to Video Pack mother program Cequadrat's WinonCD 3.7 power edition or above product. Once opened in WinonCD, the data file structure then adds options for previous selection and time out programming of MPEG file items. WinonCD then allow inventor to include WAV files behind the disc track preparation list for CD-DA playback. WAV file can also be 5.1 digital surround sound bitstream data as explained in inventors other patent application article 09/696,325. To prepare WAV file for disc authoring, all independent songs or tracks must first be joined or appended together into one complete WAV file. Reason for this method is to guarantee the disc will be free from errors that result from the gaps between independent WAV files. This can cause pops and E32 type errors when played back in CD players and attempts at disc manufacture replication glass mastering process. At the beginning of the final completed WAV file, a ten second WAV file of 0 db or silence is then appended or joined to the beginning of original WAV file. This can be accomplished with a few commercial PC or MAC two track WAV file editors such as Bias Peak or Sonic Foundry's Sound Forge. The latter is the inventor's choice of program. Once the appending of the WAV files are done, the WAV file is now inserted into the track structure of the WinonCD program Graphic waveform editing of WAV files is now performed adding P and Q codes also known as TOC track numbers and indexes. The first track insertion in this process is inserted at the point of actual audio beginning of the WAV file. This insertion is labeled track two after the track one of splice ten second WAV silence the track number of inserts ascend concurrently after this point. Once this step is complete, the final step is to add the VBR encoded MPG file to the ISO 9660 compliant portion of the disc. A first burn of this authored disc is performed. The settings chosen for this is disc at once closed session. An image file is first prepared by program then burned in a constant mode with an uninterrupted burn laser interaction with CD-R recording medium. Inventor has found the best CD-r recording medium for this task is the MITSUI brand 74 minute medium. This disc produces no jitter and provides reliability. This is extremely important to this process, as next step require a raw scan and extraction of disc image. When CD is finally complete of first burn process, what is resulted is a traditional white book 2.0 compliant video CD with the rare addition of CD-DA tracks contained in original spec. Track one of final disc contains all data needed for playback of disc in DVD/VCD players, all associated MPEG file play items and menus converted to red book style absolute time. Simple explanation of this is if there is an MPEG video play item contained in this area with an play time if 30 mins, then disc has a play time of 30 mins contained on track one of disc if played back in an traditional CD player without MPEG decoding capabilities. After which start CD-DA tracks at track two of disc. Track two in this instance being that of the 10 second silence originally authored. Between track one and two of this disc contain the offending error information of sectors caused by the abrupt split of disc modes instigated by a PRE GAP before track two CD-DA track/sector data The lead out point of this burned disc also contains the offending incomplete lead out point This lead out point expose the end of the raw WAV file to the CD player and pop error audibly when playback extend to the end of disc.

Next step of authoring call for the raw extraction of this disc into the form of a disc image, with the creation of a CUE file or TXT file also known as a cue sheet. Inventor choice program for this task is CDRWIN 4.0b product from Goldenhawk. Settings are raw mode, with jitter correction enabled. Once this task is complete the result is a binary file of disc image with an extension of BIN and an accompanying cue sheet with the extension of CUE. The purpose of the cue sheet is to tell an ISO 9660 mastering program such as CDRWIN instructions of formatting, modes, and structuring of disc to be created. Cue sheet reliant ISO 9660 mastering programs are the preferred disc mastering method used by replication plants and programming of cue sheets are common in this field. One problem with multi file cue sheet programming rather than BIN file binary disc image formatting when mastering a disc cause the authoring program to seek files at different areas of an computers hard disc, thus needing to join them giving room for jitter and PRE GAP problems. Inventor have found the BIN file disc image way to be the true way to creating following resulting disc. The unedited original cue sheet of this white book CD may look somewhat like this (FIG. 1):
FILE "E:\WUFINAL.BIN" BINARY
TRACK 01 MODE2/2352
INDEX01 00:00:00
TRACK 02 AUDIO
PREGAP 00:03:00
INDEX 01 20:04:64
TRACK 03 AUDIO
INDEX 01 20:14:64
TRACK 04 AUDIO
INDEX 01 24:33:41

Figure 2:
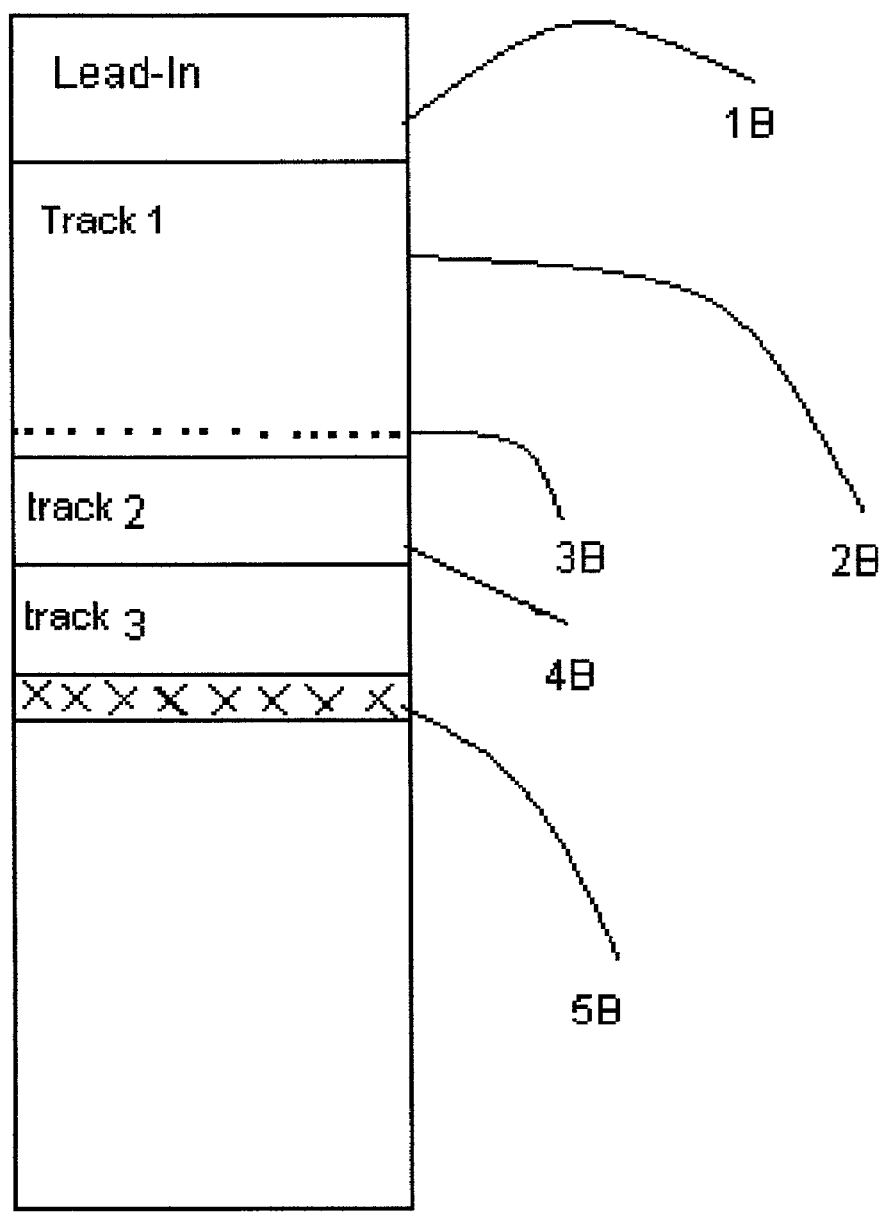

As shown above track one start with an index of 01 and is in the ISO 9660 format of Mode2 with a reserve of 2352 scrambled disc sectors. There is a PRE GAP before index 01 of track two. This is the area inventor concentrated on to relieve error problem. With track two originally programmed to be a "dummy" track for this stage of edited authoring, the resulting invented programming of original cue sheet should result to this (explanation below) (FIG. 2):
FILE "E:\WUFINAL.BIN" BINARY
TRACK 01 MODE2/2352
INDEX 00 00:00:00
INDEX 01 20:10:64
TRACK 02 AUDIO
INDEX 01 20:14:64
TRACK 03 AUDIO
INDEX 01 24:33:41

As shown a programming insert of index 00 was added to track one, while index 01 TOC start time has changed to 20:10:64. This programming change now allow CDRWIN to rewrite a mode 2 read flag over the offending join area of original sectors onto the WAV file original area of 10 second silence. This now mask the error cause by sectors resulting in a seamless mandatory 4 seconds (as dictated by the Sony/Philips yellow book CD-ROM spec) of silence contained on track one. Traditional CD players are not built to read track one 00 indexes, so this area is always skipped by CD player.

This track will now play about 3 seconds harmlessly into track two where programming change is now at the beginning of actual start of audio contained in before mentioned WinonCD authoring and now actual binary BIN file placement. Cue sheet track order changes now ascend upward from this point. Final step is the insertion of second blank MITSUI CD-R. All disc extraction and burn duties of this process are performed at 1× speed for accurate authoring. All burn duties for this method are done at a speed of 2× to 4× for even burn of data. 1× burn speed is subject to jitter. Final ISO 9660 disc mastering by CDRWIN correctly burn lead in containing updated and new TOC, program area containing track modes dictated by cue sheet regardless of original binary BIN file, and a true CD player compliant lead out point The resulting disc when played in a CD player will auto repeat, skip to next disc due to proper lead out point. Track one is now a 3-second usually unnoticeable track time that goes smooth and seamlessly into CD-DA beginning track two. When invented formatted disc is inserted into an MPEG playback device (i.e. DVD player) initial scan of disc is performed for detection purposes. Once done the player will automatically read the white book 2.0 file system and load accordingly with PBC. Since all files are contained in same data area of disc, the playback device uses a somewhat of an ISO CD ROM method for file playback hence the need for MPEG tracks. Another way to achive this result is the formatting of track 1 mpeg data track, then conversion from .BIN file format to .ISO file format. Once .ISO file format conversion is complete, the addition of CD-DA audio tracks can be added via CDRWIN cue sheet addition editing. Inventors choice of BIN to ISO conversion is a PC program called Binchunker. Audio silence can be any length of 10 seconds to 1 minute in the authoring of track 2 of this disc.

CDRWIN use a DAO (disc at once) method for final authoring duties of this process. The final resulting disc is now ready for mass commercial replication without the chance of an uncorrectable E32 error. DVD players do not traditionally read CD-R disc due to the differences of disc makeup between manufactured pressed disc and CD-r disc.

The invention claimed is:
1. A method of encoding to an MPEG stream and encoding to CD media, the CD media compliant with White Book ISO 9660 2.0 format, having a table of contents, wherein upon playback preventing audio switching noise and popping, associated with auto repeat operations of playback CD devices, caused by not detecting the true end points associated with conventionally encoded CDs, during playback in Red Book compliant players, the encoding method comprising the steps of:
receiving and encoding a source of at least audio and video content data,
authoring the conventional cue sheet by modifying the index to point at track one index 00, and
adding ten seconds of WAV file data having 0 db or silence appended to the beginning of the encoded original WAV file and storing the appended WAV file on the CD media,
upon reproduction of the CD media is accomplished without interrupting play time of the CD media data track one and which is limited to 4 seconds of audio playback and reproduction of the CD media in DVD players allow playback control operations of all files contained in the data track one, without the utilization of the table of contents track above one, to do so.

2. The method of claim 1, wherein the source of audio and video content is one of an analog capture or an AVI file derived from a digital source, one of a Mini DV and Digital 8.

3. The method of claim 1, wherein the audio is 5.1 digital surround sound.

4. The method of claim 3, wherein the 5.1 digital surround sound is a DTS WAV format.

* * * * *